United States Patent Office 3,672,924
Patented June 27, 1972

3,672,924
THERMALLY STABLE AIR FILTER GELS
James P. Hamilton, Pasadena, Md., assignor to FMC
Corporation, New York, N.Y.
No Drawing. Continuation-in-part of application Ser. No. 16,560, Mar. 4, 1970, which is a continuation-in-part of abandoned application Ser. No. 654,714, July 20, 1967. This application Oct. 23, 1970, Ser. No. 83,632
Int. Cl. C09k 1/04
U.S. Cl. 106—287       7 Claims

ABSTRACT OF THE DISCLOSURE

Thermally stable triorganic phosphate coating compositions for viscous-impingement air filters are prepared by thickening 100 parts of a triorganic phosphate with a combination of 0.5 to 5 parts of a pure pyrogenic silica with 0.5 to 7 parts by weight of a hydrated salt, aluminum distearate or synthetic calcium silicate.

CROSS-REFERENCE TO RELATED APPLICATIONS

This application is a continuation-in-part of United States Ser. No. 16,560, filed Mar. 4, 1970 now abandoned which was a continuation-in-part of United States Ser. No. 654,714 filed July 20, 1967, now abandoned.

BACKGROUND OF THE INVENTION (A) Field of the invention

This invention relates to novel, bodied, thixotropic phosphate gel compositions suitable for coating dust filter media in air filters.

(B) Description of the prior art

Viscous-impingement type industrial air filters contain porous filter media, or mats, through which air is passed. The filter medium is coated with a stable, nonvolatile liquid, such as a non-flammable phosphate ester, which entraps dust particles as they pass through the filter and prevents them from becoming reentrained in the air stream. However, loss of this liquid coating during use results in a lowering of the air cleaning capacity of the filter. The liquid may be blown off the filter media by the high air velocities encountered, for example, with diesel engine filters. Moreover, when the filter medium is tightly wound around spools, as in the recently developed automatic replacement filters, the liquid tends to be squeezed out of the filter media.

In the past, these losses have been reduced by bodying the liquid with a semi-soluble resin or other gelling agent. However, these resin-liquid compositions tend to decrease in viscosity at elevated temperatures, especially at the temperatures reached with diesel engine filters. If gelling agents, such as finely divided silica are used, as much as 7%, based on the mixture, is ordinarily required for satisfactory thickening. This amount of silica in the liquid can clog spray nozzles and associated filters generally used in coating the mat. Furthermore, the mixture becomes thickener upon aging due to syneresis resulting in the reduction of the ability to entrap dust particles. Syneresis may also occur during storage causing the liquid to separate from the gel structure. The separated liquid will then drain out of the mat leaving a higher concentration of gel solids on the surface of the mat. The overall effect is a loss in dust capacity.

Excellent phosphate ester gels for use in viscous-impingement type air filters can be prepared by using surfactants with low levels of silica, as described in U.S. Pat. 3,297,460.

SUMMARY OF THE INVENTION

I have now discovered improved coating compositions for viscous-impingement air filters which comprise: (a) 100 parts by wight of a triorganic phosphate of the formula:

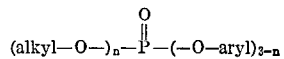

in which $n$ is 0–1, the alkyl radical is of 1–8 carbon atoms and the aryl radical is derived from tar acids; (b) 0.5–5 parts by weight of substantially pure pyrogenic silica having a particle size not greater than 0.025 microns; and (c) 0.5 to 7 parts by weight of one of the group consisting of hydrated salts, aluminum distearate and synthetic calcium silicate. The pyrogenic silica alone does not thicken the triorganic phosphate sufficiently to form satisfactory coating compositions. Triorganic phosphate compositions containing a pyrogenic silica and component (C) are thickened enough to be useful as coatings for air filter media that do not drain from the filter at room temperature and maintain a sufficiently high viscosity at elevated temperatures to perform satisfactorily. Surprisingly the compositions generally increase rather than decrease in viscosity when they are heated.

DESCRIPTION OF THE INVENTION AND THE PREFERRED EMBODIMENTS

The triorganic phosphates which are useful in accordance with this invention are those having the formula:

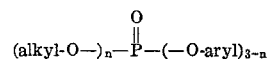

in which $n$ is 0–1, the alkyl radical is 1–8 carbon atoms and the aryl radical is derived from tar acid. The term "tar acid" is intended to include those acids which can be extracted with dilute caustic soda from tars such as coal tar, common wood tar and lignite tar. Crude tar acid extracts usually contain phenol, ortho-cresol, meta-cresol, para-cresol, and six isomeric xylenols, and they can be fractionated to give various grades of these products. The term "tricresyl phosphate" is intended to include esters made from phosphoric acid and a mixture of alkyl phenols known as "cresylic acid" which may be derived from coal tar, wood tar, or petroleum distillate. Suitable alkyl radicals include methyl, ethyl propyl, isopropyl, butyl, amyl, isohexyl and ethylhexyl, as well as others. Preferably the phosphate is tricresyl phosphate.

The silica that I have used in preparing the high viscosity compositions of this invention is of the type known as "pyrogenic silica." It is prepared by reacting almost pure silicon tetrachloride and water in the vapor phase to produce silicon dioxide and hydrogen chloride. The silica so produced is a very pure powder, of the order of 99% pure having a particle size not greater than about 0.025 microns. Pyrogenic silicas having particle sizes as small as about 0.007 microns are presently available. Preferably, the pyrogenic silica has a particle size of about 0.015–0.020 microns.

I have found many hydrated salts, including monohydrates, to be useful in preparing the compositions of this invention, however, salts containing at least three molecules of water of hydration are preferred. Hydrated salts useful in practicing my invention include, but are not limited to

| | |
|---|---|
| $Al(BrO_3)_3 \cdot 9H_2O$, | $PbSiF_6 \cdot 4H_2O$, |
| $AlBr_3 \cdot 6H_2O$, | $LiOH \cdot H_2O$, |
| $AlBr_3 \cdot 15H_2O$, | $LiNO_3 \cdot 3H_2O$, |
| $AlCl_3 \cdot 6H_2O$, | $Mg(BrO_3)_2 \cdot 6H_2O$, |
| $Al_2O_3 \cdot 6H_2O$, | $MgBr_2 \cdot 6H_2O$, |
| $AlI_3 \cdot 6H_2O$, | $MgSO_4 \cdot 7H_2O$, |
| $Al(NO_3)_3 \cdot 9H_2O$, | $MnBr_2 \cdot 4H_2O$, |
| $BaCl_2 \cdot 2H_2O$, | $Mn_2P_2O_7 \cdot 3H_2O$, |
| $BaPtCl_6 \cdot 6H_2O$, | $MgSiF_6 \cdot 2H_2O$, |
| $Ba(OH)_2 \cdot 8H_2O$, | $Ni_3(PO_4)_2 \cdot 8H_2O$, |
| $Be(NO_2)_2 \cdot 3H_2O$, | $NiSO_4 \cdot 6H_2O$, |
| $Be_3(PO_4)_2 \cdot 3H_2O$, | $PdSO_4 \cdot 2H_2O$, |
| $BeSO_4 \cdot 4H_2O$, | $PtCl_4 \cdot 5H_2O$, |
| $CdCl_2 \cdot 2½H_2O$, | $KAl(SO_4)_2 \cdot 12H_2O$, |
| $Cd(NO_3)_2 \cdot 4H_2O$, | $K_2B_4O_7 \cdot 8H_2O$, |
| $CdSO_4 \cdot H_2O$, | $K[Cr(SO_4)_2] \cdot 12H_2O$, |
| $CdSO_4 \cdot 7H_2O$, | $K_2CO_3 \cdot 2H_2O$, |
| $Ca(BO_2)_2 \cdot 6H_2O$, | $Rh(NO_3)_2 \cdot 2H_2O$, |
| $CaBr_2 \cdot 6H_2O$, | $RbGa(SO_4)_2 \cdot 12H_2O$, |
| $CaCl_2 \cdot 6H_2O$, | $NaBO_2 \cdot 4H_2O$, |
| $CaCl_2 \cdot 6H_2O$, | $NaBr \cdot 2H_2O$, |
| $CaI_2 \cdot 6H_2O$, | $Na_2CO_3 \cdot H_2O$, |
| $Ce_2(SO_4)_3 \cdot 8H_2O$, | $Na_2CO_3 \cdot 10H_2O$, |
| $Cs_2S \cdot 4H_2O$, | $Na_2CO_3 \cdot 7H_2O$, |
| $Cr(NO_3)_3 \cdot 9H_2O$, | $Na_3RhCl_6 \cdot 18H_2O$, |
| $CoBr_2 \cdot 6H_2O$, | $Na_3PO_4 \cdot 12H_2O$, |
| $CoCl_2 \cdot 2H_2O$, | $SrBr_2 \cdot 6H_2O$, |
| $Co_2F_6 \cdot 7H_2O$, | $Sr(OH)_2 \cdot 8H_2O$, |
| $CuCl_2 \cdot 2H_2O$, | $TlAl(SO_4)_2 \cdot 12H_2O$, |
| $Cu(NO_3)_2 \cdot 6H_2O$, | $TlCl_3 \cdot 4H_2O$, |
| $Cu_2SO_4 \cdot 5H_2O$, | $ThF_4 \cdot 4H_2O$, |
| $GaF_3 \cdot 3H_2O$, | $Sn(NO_3)_2 \cdot 2H_2O$, |
| $InF_3 \cdot 3H_2O$, | $TiBr_3 \cdot 6H_2O$, |
| $In_2(SO_4)_3 \cdot 9H_2O$, | $ZnF_2 \cdot 4H_2O$, |
| $FeBr_3 \cdot 6H_2O$, | $ZnSO_4 \cdot 7H_2O$ and |
| $FeSiF_6 \cdot 6H_2O$, | $Na_2B_4O_7 \cdot 10H_2O$. |

So far as is known, any hydrated salt containing at least one molecule of water of hydration is useful to same extent in practicing my invention.

Additionally I have found aluminum distearate, though not hydrated, can be used to replace hydrated salts as can synthetic calcium silicates.

The coating compositions of this invention are prepared by grinding the hydrated salt in a small amount of triorganic phosphate to produce a smooth paste. Some hydrates such as hydrated aluminum oxide are commercially available in sufficiently fine form to be dispersed directly without requiring grinding. The hydrated salt either in a smooth paste or in a finely ground form and the pyrogenic silica are simply dispersed is a triorganic phosphate by mixing with a suitable stirrer. Laboratory samples were mixed with a stirrer for three minutes at approximately 2,000 r.p.m.

Aluminum distearate was evaluated as a replacement for the hydrated salt. Aluminum distearate instead of being hydraed per se, contains a residual hydroxyl group. Aluminum distearate is a poor gellant for triorganic phosphates. Quite surprisingly, in combination with four parts of pyrogenic silica, the combined effect of the aluminum distearate with pyrogenic silica causes a very significant viscosity increase.

Synthetic calcium silicate (Microcel, from Johns-Manville Company) which contains six percent by weight water was investigated as a replacement for pyrogenic silica. Used alone the synthetic calcium silicate was found to be ineffective as a gelling agent. However, mixtures of pyrogenic silica with the synthetic calcium silicates causes a significant viscosity increase in a tricresyl phosphate. Two grades of Microcel, T38 and T70 were evaluated, the latter effecting the greatest viscosity increase in triorganic phosphates. The T70 Microcel has a higher specific gravity and a lower water absorption and in combination with a pyrogenic silica was found to have a more significant effect on viscosity and gellation of triorganic phosphates than the T38.

The following examples, illustrating the novel filter medium coating compositions of this invention, are presented with no intent that the invention be limited thereto. All parts and percentages are by weight.

EXAMPLE 1

Borax ($Na_2B_4O_7 \cdot 10H_2O$) was ground on a three-roll ink mill using tricresyl phosphate as a grinding medium to form a smooth paste of the hydrate in tricresyl phosphate. This paste was used to prepare a series of coating compositions containing varying amounts of Borax. A small amount of the paste containing the Borax and pyrogenic silica was simply stirred with sufficient triorganic phosphate to produce coating compositions containing 100 parts of triorganic phosphate, three parts of pyrogenic silica and 1 to 4 parts of Borax. The composition details and the viscosity characteristics of the various mixtures of tricresyl phosphate, pyrogenic silica and hydrate are found in Table 1. Comparison examples including pyrogenic silica used at two levels are enclosed in the tables. The viscosities of the various coating compositions were determined using a Brookfield Viscometer Model LVF using the number 4 spindle at 6 and 60 r.p.m. The viscosities of these mixtures were also measured at various elevated temperatures using the Brookfield Viscometer Model LVF with a number 4 spindle at 6 r.p.m.

TABLE 1

| | Comparison | | A | B | C | D |
|---|---|---|---|---|---|---|
| Tricresyl phosphate | 100 | 100 | 100 | 100 | 100 | 100 |
| Pyrogenic silica | 3 | 4 | 3 | 3 | 3 | 3 |
| $Na_2B_4O_7 \cdot 10H_2O$ | | | 1 | 2 | 3 | 4 |
| Viscosity: | | | | | | |
| Initial 6 r.p.m. | 600 | 420 | 500 | 500 | 500 | 500 |
| (Cps.) 60 r.p.m. | 320 | 320 | 350 | 350 | 350 | 350 |
| Viscosity: | | | | | | |
| Aged 24 hrs. 6 r.p.m. | 240 | 400 | 300 | 1,500 | 1,720 | 1,800 |
| (Cps.) 60 r.p.m. | 210 | 315 | 230 | 520 | 590 | 600 |
| Viscosity at T.° C. (Cps.) 6 r.p.m.: | | | | | | |
| 23 | 240 | 400 | 300 | 1,500 | 1,720 | 1,800 |
| 28 | 200 | 420 | 380 | 1,500 | 2,240 | 2,600 |
| 33 | 200 | 400 | 600 | 1,600 | | 3,060 |
| 38 | 200 | 320 | 700 | 1,680 | 3,020 | 3,300 |
| 43 | 200 | 340 | 800 | 1,700 | 3,300 | 3,640 |
| 48 | 200 | 300 | 1,800 | 2,600 | 4,600 | 3,900 |
| 53 | 200 | 300 | 1,780 | 3,400 | 5,400 | 4,600 |
| 58 | 200 | 300 | 2,300 | 4,400 | 6,700 | 6,000 |
| 65 | 200 | 580 | 3,300 | 4,880 | 9,800 | 7,600 |
| 70 | 240 | 800 | 3,700 | 4,200 | 8,800 | 9,420 |
| 75 | 300 | 1,200 | 3,300 | 3,800 | 8,700 | 9,200 |
| 80 | 320 | 2,000 | 2,700 | 3,040 | 5,620 | 7,900 |

EXAMPLE 2

Tricresyl phosphate was mixed with finely ground hydrated aluminum oxide and finely ground hydrated aluminum oxide with a stearic acid coating and pyrogenic silica in a high speed laboratory mixer, such as a Waring Blendor. Varying amounts of the hydrated aluminum oxide were added to a number of compositions. The composition details and viscosities measured at various elevated temperatures are included in Table 2, along with comparison examples using only pyrogenic silica. The Brookfield viscosities were measured as in Example 1.

TABLE 2

|  | A | B | C | D | E | F | G | H | | Comparison |
|---|---|---|---|---|---|---|---|---|---|---|
| Tricresyl phosphate | 100 | 100 | 100 | 100 | 100 | 100 | 100 | 100 | 100 | 100 |
| Pyrogenic silica | 3 | 3 | 3 | 4 | 4 | 4 | 4 | 4 | 3 | 4 |
| Hydrated aluminum oxide [1] | 3 | 6 |  | 0.5 | 0.7 | 0.8 |  |  |  |  |
| Steric acid coating [2] |  |  | 3 |  |  |  | 0.5 | 0.7 |  |  |
| Viscosity (Cps.) at T.° C. (LVF 6 r.p.m.): |  |  |  |  |  |  |  |  |  |  |
| 25 | 4,600 | 6,000 | 7,000 | 17,900 | 9,500 | 13,600 | 9,340 | 6,060 | 240 | 400 |
| 30 | 4,520 | 8,000 | 7,000 | 16,200 | 11,600 | 13,660 | 9,500 | 6,620 | 200 | 420 |
| 35 | 4,420 | 8,700 | 6,700 | 16,200 | 11,620 | 13,520 | 9,500 | 7,760 | 200 | 400 |
| 40 | 4,280 | 10,920 | 6,240 | 16,300 | 11,700 | 13,500 | 9,300 | 7,620 | 200 | 320 |
| 50 | 3,800 | 12,500 | 5,900 | 13,600 | 9,720 | 11,200 | 8,300 | 8,580 | 200 | 300 |
| 55 | 3,300 | 11,000 | 5,680 | 13,200 | 8,340 | 9,060 | 7,600 | 8,400 | 200 | 300 |
| 65 | 2,620 | 7,200 | 4,700 | 10,000 | 6,080 | 7,100 | 5,680 | 6,920 | 200 | 500 |
| 70 | 2,300 | 6,000 | 4,140 | 9,120 | 5,560 | 6,140 | 4,720 | 6,100 | 240 | 800 |
| 80 | 2,000 | 4,300 | 3,340 | 6,500 | 4,100 | 4,200 | 3,080 | 4,000 | 320 | 2,000 |
| 90 |  |  |  | 6,000 | 3,420 | 3,000 | 2,600 | 3,180 |  |  |
| 100 |  |  |  | 5,440 | 2,200 | 2,300 | 2,060 | 2,140 |  |  |
| 110 |  |  |  |  |  |  | 2,500 |  |  |  |

[1] Finely ground hydrated aluminum oxide (Hydral 710, Alcoa).
[2] Finely ground hydrated aluminum oxide with steric acid coating (Hydral 710S, Alcoa).

EXAMPLE 3

Additional hydrated salt-pyrogenic silica-gelled coating compositions gelled with a mixture of hydrated salt and pyrogenic silica were prepared from a commercially available tricresyl phosphate. The compositions were prepared according to the procedure described in Example 1 substituting a number of hydrated salts for the Borax used in Example 1. The compositions and Brookfield Viscosities (Model LVF, Number 4 spindle) measured as in Example 1, are presented in the following table.

TABLE 3

|  | A | B | C | D | E | F | G | H |
|---|---|---|---|---|---|---|---|---|
| Tricresyl phosphate | 100 | 100 | 100 | 100 | 100 | 100 | 100 | 100 |
| Pyrogenic silica | 3 | 3 | 3 | 3 | 3 | 3 | 3 | 3 |
| $CaCl_2 \cdot 6H_2O$ | 1 | 4 |  |  |  |  |  |  |
| $MgSO_4 \cdot 7H_2O$ |  |  | 1 | 3 |  |  |  |  |
| $Na_3PO_4 \cdot 12H_2O$ |  |  |  |  | 3 |  |  |  |
| $Na_2CO_3 \cdot 10H_2O$ |  |  |  |  |  | 1 | 3 |  |
| $Na_2CO_3 \cdot H_2O$ |  |  |  |  |  |  |  | 0.5 |
| Viscosity at T.° C. (Cps.) 6 r.p.m., No. 4 spindle: |  |  |  |  |  |  |  |  |
| 24 | 240 | 240 | 800 | 4,500 | 500 | 300 | 340 | 500 |
| 30 | 180 | 200 | 1,200 | 4,800 | 500 | 300 | 600 | 500 |
| 40 | 100 | 180 | 4,200 | 12,000 | 500 | 400 | 1,280 | 500 |
| 50 | 100 | 200 |  | 24,000 | 500 | 800 | 2,600 | 1,300 |
| 60 | 100 | 400 | 4,500 | 24,000 | 500 | 1,500 | 4,800 | 2,200 |
| 70 | 120 | 2,980 | 5,500 | 20,000 | 600 | 2,600 | 5,200 | 2,500 |
| 80 | 200 | 4,300 |  |  |  | 2,400 | 4,000 | 2,500 |
| 90 |  |  | 4,500 | 12,000 | 5,000 |  |  | 2,500 |
| 100 |  |  |  | 6,000 |  |  |  | 2,000 |

EXAMPLE 4

Coating compositions gelled with aluminum distearate and pyrogenic silica were prepared from a commercially available tricresyl phosphate. The compositions were prepared and evaluated as described in Example 1. The compositions and Brookfield Viscosities (Model LVF, number 4 spindle at 6 r.p.m.) at elevated temperatures of these mixtures, are presented in the following table.

TABLE 4

|  | Comparison | | A |
|---|---|---|---|
| Tricresyl phosphate | 100 | 100 | 100 |
| Pyrogenic silica |  | 4 | 4 |
| Aluminum distearate |  | 5 | 5 |
| Viscosity at T.° C. (Cps.) 6 r.p.m.: |  |  |  |
| 23 |  | 400 | 300 | 9,000 |
| 30 |  | 420 | 400 | 13,800 |
| 40 |  | 320 | 400 | >20,000 |
| 50 |  | 300 | 540 | >20,000 |
| 60 |  | 300 | 500 | >20,000 |
| 70 |  | 800 | 640 | >20,000 |
| 80 | 2,000 | 680 | >20,000 |
| 90 |  | 600 | >20,000 |
| 100 |  | 600 | >20,000 |

EXAMPLE 5

Triorganic phosphate coating compositions were prepared from a commercially available tricresyl phosphate gelled with synthetic calcium silicates and pyrogenic silica. The compositions were prepared and evaluated as described in Example 1. The compositions and Brookfield Viscosities (Model LVF, spindle number 4 at 6 r.p.m.) at various elevated temperatures are presented in the following table.

TABLE 5

|  | Comparison | A | B |
|---|---|---|---|
| Tricresyl phosphate | 100 | 100 | 100 | 100 |
| Pyrogenic silica |  | 3 | 3 |
| Calcium silicate [1] | 3 |  | 3 |
| Calcium silicate [1] |  | 3 |  | 3 |
| Viscosity at T.° C. (Cps.) 6 r.p.m.: |  |  |  |  |
| 24 | 400 | 400 | 6,000 | 9,500 |
| 40 |  |  | 6,000 | 10,000 |
| 60 |  |  | 4,000 | 6,000 |
| 80 |  |  | 3,400 | 5,000 |
| 110 |  |  | 1,500 | 4,500 |

[1] Synthetic calcium silicate, Johns-Manville.

EXAMPLE 6

Triorganic phosphate coating compositions were prepared from several commercially available triorganic phosphates which were mixed with finely ground hydrated aluminum oxide which had a stearic acid coating, and pyrogenic silica. The compositions were prepared and evaluated as described in Example 1. The compositions, ingredients and Brookfield viscosities (Model LVF, spindle number 4 at 6 and 60 r.p.m.) at various elevated temperatures are presented in the following table.

TABLE 6

|  | A | B | C | D | E |
|---|---|---|---|---|---|
| Tricresyl phosphate | 100 |  |  |  |  |
| Tris (2-butoxyethyl phosphate) |  | 100 |  |  |  |
| Trioctyl phosphate |  |  | 100 |  |  |
| Octyl diphenyl phosphate |  |  |  | 100 |  |
| Cresyl diphenyl phosphate |  |  |  |  | 100 |
| Pyrogenic silica | 4.0 | 4.0 | 4.0 | 4.0 | 4.0 |
| Hydrated aluminum oxide with stearic acid coating | 0.5 | 0.5 | 0.5 | 0.5 | 0.5 |
| Viscosity: |  |  |  |  |  |
| Initial 6 r.p.m. | 5,500 | 1,000 | 1,100 | 1,500 | 1,500 |
| (Cps.) 60 r.p.m. | 1,560 | 300 | 350 | 360 | 480 |
| Viscosity at T.° C. (Cps. at 6 r.p.m.): |  |  |  |  |  |
| 22 | 9,000 | 1,000 | 1,500 | 1,500 | 1,500 |
| 40 | 8,500 | 900 | 1,400 | 1,000 | 1,500 |
| 60 | 6,000 | 600 | 1,100 | 1,000 | 1,500 |
| 80 | 4,000 | 500 | 600 | 1,000 | 2,000 |
| 100 | 3,000 | 500 | 500 | 900 | 2,000 |
| 120 | 3,000 | 500 | 500 | 600 | 2,000 |

EXAMPLE 7

Pyrogenic silica and finely ground synthetic calcium silicate were dispersed with a laboratory stirrer, at high speed, in a tricresyl phosphate which had a viscosity of 122 centipoises at 22° C. The resultant dispersion compositions and their viscosity characteristics, determined with a Brookfield viscometer, Model LVF, with a number 4 spindle at 6 r.p.m. (revolutions per minute) at 24° C. were as follows:

| | Comparison | | Examples of the invention | | | |
|---|---|---|---|---|---|---|
| | | | A | B | C | D |
| Tricresyl phosphate | 100 | 100 | 100 | 100 | 100 | 100 | 100 | 100 |
| Pyrogenic silica | | 3 | | 6 | 0.5 | 1.5 | 3 | 5 |
| Calcium silicate [1] | 3 | | 6 | | 0.5 | 1.5 | 3 | 7 |
| Viscosity, cps | 400 | 400 | 5,900 | 3,600 | 500 | 2,500 | 22,000 | 100,000 |

[1] Microcel T-70, Johns Manville Co., used in combination with a hydrated salt to thicken tricresyl phosphate.

The above data show that neither pyrogenic silica nor synthetic calcium silicate alone is highly useful as a thickener for tricresyl phosphate, and that each material produced about the same degree of thickening of the tricresyl phosphate. Surprisingly, a combination of pyrogenic silica with synthetic calcium silicate is synergistic in thickening effect as the thickening effect of the combination is much greater than additive.

Dispersions of calcium silicate and pyrogenic silica with Borax were prepared as described above. The compositions and their viscosity characteristics are set forth in the following table.

| | Comparison | E |
|---|---|---|
| Tricresyl phosphate | 100 | 100 |
| Pyrogenic silica | | 3 |
| Calcium silicate | 3 | |
| Na$_2$B$_4$O$_7 \cdot$10H$_2$O | 3 | 3 |
| | | C |
| Viscosity, centipoises at 6 r.p.m., ° C. | | |
| 24 | 900 | 1,720 |
| 30 | 1,000 | 2,700 |
| 40 | 900 | 3,200 |
| 50 | 700 | 4,800 |
| 60 | 700 | 7,400 |
| 70 | 1,000 | 8,800 |
| 80 | 1,000 | 5,600 |

The data comparing the effect of calcium silicate and pyrogenic silica in combination with a hydrated salt show that calcium silicate is not equivalent to pyrogenic silica when used in combination with a hydrated salt to thicken tricresyl phosphate.

The principle of this invention has been explained and exemplified in a manner so that it can be readily practiced by those skilled in the art. The best mode contemplated by the inventor has been set forth. Clearly, within the scope of the appended claims the invention may be practiced by those skilled in the art having this disclosure otherwise than as specifically described and exemplified herein.

What is claimed is:

1. A triorganic phosphate coating composition for viscous-impingement air filters which comprises: (a) 100 parts by weight of a triorganic phosphate of the formula:

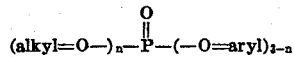

in which $n$ is 0 to 1, the alkyl radical is of 1–8 carbon atoms and the aryl radical is derived from tar acids; (b) 0.5 to 5 parts by weight of substantially pure pyrogenic silica having a particle size not greater than 0.025 microns; and (c) 0.5 to 7 parts by weight of a material selected from the group consisting of finely ground hydrated salts having at least 1 molecule of water of hydration, aluminum distearate and synthetic calcium silicate.

2. The coating composition of claim 1 in which the (c) material is a finely ground hydrated salt having at least one molecule of water of hydration.

3. The coating composition of claim 1 in which the (c) material is finely ground synthetic calcium silicate.

4. The coating composition of claim 1 in which the triorganic phosphate is tricresyl phosphate and the pyrogenic silica has a particle size of 0.015–0.020 microns.

5. The coating composition of claim 1 in which the hydrated salt contains three molecules of water of hydration.

6. A triorganic phosphate coating composition for viscous-impingement air filters which comprises: (a) 100 parts by weight of a triorganic phosphate of the formula:

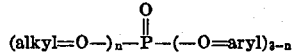

in which $n$ is 0 to 1, the alkyl radical is of 1–8 carbon atoms and the aryl radical is derived from tar acids; (b) 0.5 to 5 parts by weight of substantially pure pyrogenic silica having a particle size not greater than 0.025 microns; and (c) 0.5 to 7 parts by weight of a finely ground material selected from the group consisting of finely ground Na$_2$B$_4$O$_7 \cdot$10H$_2$O, Al$_2$O$_3 \cdot$3H$_2$O,

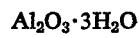

containing a stearic acid coating, CaCl$_2 \cdot$6H$_2$O, MgSO$_4 \cdot$7H$_2$O and Na$_3$PO$_4 \cdot$12H$_2$O.

7. A triorganic phosphate coating composition for viscous-impingement air filters which comprises: (a) 100 parts by weight of a triorganic phosphate of the formula:

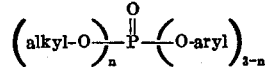

in which $n$ is 0 to 1, the alkyl radical is of 1–8 carbon atoms and the aryl radical is derived from tar acids; (b) 0.5 to 5 parts by weight of substantially pure pyrogenic silica having a particle size not greater than 0.025 microns; and (c) 0.5 to 7 parts by weight of a finely ground material selected from the group consisting of finely ground Na$_2$B$_4$O$_7 \cdot$10H$_2$O, Al$_2$O, Al$_2$O$_3 \cdot$3H$_2$O, Al$_2$O$_3 \cdot$3H$_2$O containing a stearic acid coating,

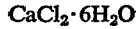

MgSO$_4 \cdot$7H$_2$O, Na$_3$PO$_4 \cdot$12H$_2$O and aluminum distearate.

References Cited
UNITED STATES PATENTS 3,297,460 10/1967 Rau _____ 106—287
3,133,884 5/1964 Graham _____ 252—88

THEODORE MORRIS, Primary Examiner

U.S. Cl. X.R.
252—88